Jan. 6, 1953  J. L. DE BOO ET AL  2,624,434

CLUTCH

Filed Dec. 10, 1949

INVENTORS
JEROME L. DEBOO
CARL W. SWAN
BY Emery Robinson
ATTORNEY

Patented Jan. 6, 1953

2,624,434

UNITED STATES PATENT OFFICE 2,624,434

CLUTCH

Jerome L. De Boo, Chicago, and Carl W. Swan, Skokie, Ill., assignors to Teletype Corporation, Chicago, Ill., a corporation of Delaware Application December 10, 1949, Serial No. 132,294

10 Claims. (Cl. 192—22)

This invention relates to clutches and more particularly to clutches suitable for use in printing telegraph apparatus.

The principal object of the present invention is to provide a clutch of the type disclosed in the copending application for patent of A. N. Nilson et al., filed November 1, 1946, Serial No. 707,176, now Patent 2,568,249 issued September 18, 1951, which is suitable for use at operating speeds covering a narrow range of rotational speeds.

The above referred to Nilson et al. clutch has been found to operate very well when the speeds of rotation of the clutch are within a comparatively narrow range. However, when the clutch rotates at speeds slower than this range, occasionally the clutch shoes will not be effectively disengaged from the driving drum when the driven member is stopped. This occurs because of the fact that there must be sufficient momentum to carry the driven member forward, after the clutch shoe operating lever has been engaged, so as to permit a latch to engage and retain the driven member in such forward position. Obviously this undesirable feature can be overcome by increasing the mass of the driven member but to do this makes the clutch sluggish and requires much stronger clutch parts.

Therefore the most important specific object of the present invention is to provide a latching mechanism for a clutch that is effective to drive the driven member forward, after a stop member has stopped rotation of the operating means for the driven member, and thereby latch the driven member in a position such that the clutch shoes are retained disengaged from the driving member.

Another object of the invention is to provide a toggle actuated clutch latching mechanism which functions to insure disengagement of the clutch shoes from the driving member when the driven member is stopped.

Other objects and advantages will be apparent to those skilled in the art from the following detailed description when read in conjunction with the attached drawing wherein.

Figure 1:
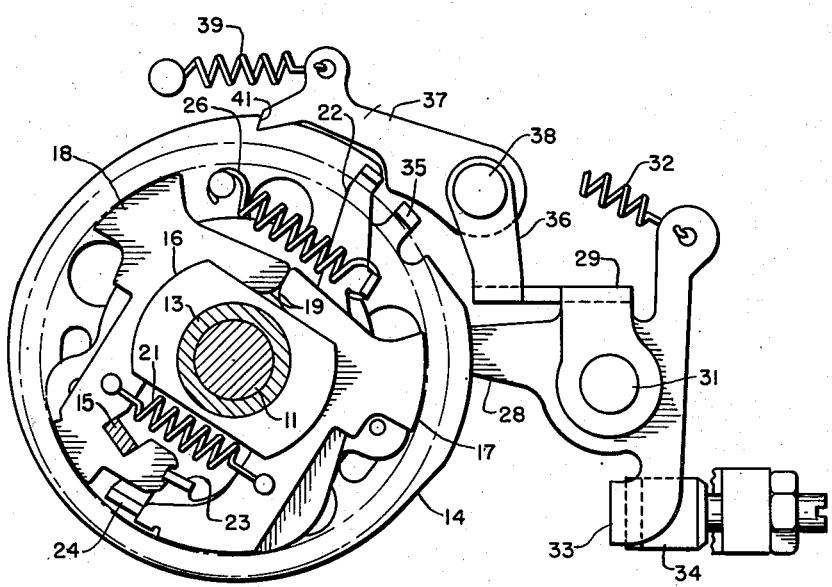
Fig. 1 is a side view of the principal parts of the invention.

No detailed description of the clutch itself will be given beyond that deemed necessary for an understanding of the invention, inasmuch as the clutch contemplated to be used in the invention is of the type disclosed in the above mentioned application of A. N. Nilson et al., which application is hereby incorporated by reference into the present disclosure.

Referring now to the drawings a drive shaft 11 has a driving drum 12 secured thereto. A sleeve 13 is rotatable on the shaft 11 and has a driven disc 14 secured thereto. The disc 14 has a driving connector 15 extending perpendicularly therefrom. The disc 14 has a collar member 16 secured thereto having slots (not shown) within which a pair of shoe members 17 and 18 are positioned. The shoe members 17 and 18 pivot on surfaces 19 and are urged toward one another by a tension spring 21. The shoe 18 has a slot formed therein and the connector 15 is positioned within the slot to provide a driving connection between the shoe 18 and the disc 14. When the spring 21 is able to urge the shoe members 17 and 18 towards one another they become disengaged from the drum 12, however, when the shoe members 17 and 18 are spread apart they engage the drum 12 to operably connect the driving drum 12 and the driven portion of the clutch.

A clutch operating lever 22 positioned within another slot formed in the collar 16 has a pair of projecting lugs 23 and 24 adapted to cooperate respectively with the shoe members 18 and 17. The particular type of slotted collar and the manner in which the shoe members 17 and 18 and the clutch lever 22 are positioned within said slots is shown in the aforementioned Nilson et al. patent. When the lever 22 is pivoted counterclockwise (Fig. 1) under the urging of a spring 26 it is apparent that the lugs 23 and 24 are moved counterclockwise relative to an imaginary center between the lugs 23 and 24 to thereby expand the shoe members 17 and 18 against the drum 12. When the clutch lever 22 is pivoted clockwise, on the other hand, the shoe members 17 and 18 contract under the urging of the spring 21 and thus become disengaged from the driving drum 12.

The clutch is designed to rotate counterclockwise when in operation and thus a stop lever 30, which cooperates with the clutch lever 22, when lowered into engagement with the lever 22, is effective to stop rotation of the driven portion of the clutch by causing disengagement of the shoe members 17 and 18 with the drum 12. The stop lever 30 is generally controlled by a magnet when used in the printing telegraph art, however it may readily be controlled manually or otherwise.

The sleeve 13 carries a cam 27 with which a follower 28 cooperates. The follower 28 is part of a bail 29 which is mounted pivotally on a shaft 31 and urged in a counterclockwise direction by a spring 32. A depending portion 33 of the bail 29 strikes a stop 34 to thereby limit its movement under the urging of the spring 32. The disc 14 is provided with a bent-over portion 35 which may be utilized to limit the relative movement of the disc 14 with respect to the lever 22. This relative movement occurs when the clutch lever 22 is engaged by the stop lever 30, then the disc 14 can advance until the bent-over portion 35 strikes the clutch lever 22. The bail 29 has an upstanding arm 36 which carries a pawl 37 by means of a pivot bolt 38. The pawl 37 is urged continuously to the left and into engagement with the disc 14 by means of a spring 39. The pawl 37 is designed to cooperate with a notch 41 in the disc 14.

In order to operate the clutch the stop lever 30 is lifted from engagement from clutch lever 22. The clutch lever is pivoted in a counterclockwise direction by the spring 26 causing the lugs 23 and 24 to press against and expand the shoe members 17 and 18 into engagement with the driving disc 12. This results in a driving connection being established between the driving and driven members of the clutch and thus a train of power may be readily traced from the driving disc 12, to the shoes 17 and 18, through the connector 15, through the disc 14, through the sleeve 13 and thence to the other driven portions of the clutch. With the shoes 17 and 18 engaged, it should be noted at this time that a space exists between the bent-over portion 35 and the clutch lever 22. This situation is clearly indicated in Fig. 1 wherein the clutch elements are shown in the engaged position.

In order to disengage the clutch, the stop lever 30 is moved into the path of movement of the clutch lever 22. As the clutch lever 22 approaches the stop lever 30, the apex of the cam 27 is effective to pivot the follower 28 against the action of its spring 32, whereupon the spring 32 is extended and potential energy is stored therein. Simultaneously, the bail 29 is pivoted in a clockwise direction to move the pawl 37 against the effect of its spring 39 whereupon the spring 39 is extended and potential energy is stored therein. An instant before the clutch lever 22 strikes the stop lever 30, the follower 28 falls from the apex of the cam 27 thereby allowing the follower 28 to move in a counterclockwise direction under the influence of the potential energy stored in the extended spring 32. The movement of the follower 28 is imparted to the toggle linkage comprising the bail 29 and the pawl 37 causing said pawl 37 to move into and engage the forward wall of the notch 41. In Fig. 1, the clutch shoes 17 and 18 are shown as being engaged and it should be again observed that under such conditions, there is a space existing between the bent-over portion 35 of the disc 14 and the clutch lever 22.

Considering now the events occurring upon and subsequent to the engagement of the stop lever 30 with the clutch lever 22, the engagement of the clutch lever 22 with the stop lever 30 results in the instantaneous stopping of the lever 22, but as the lever 22 is not securely fastened to any portion of the collar 16, the driven portions of the clutch such as the disc 14, sleeve 13 and cam 27 continue to rotate due to the momentum previously imparted to these members by the driving drum 12. This momentum is sufficient to carry the disc in the counterclockwise direction whereby the connector 15 applies a force through the shoe 18 to the lug 23. This force pivots the operating arm 22 in a clockwise direction about the imaginary pivot point between the lugs 23 and 24 whereupon the spring 26 is extended and its force tending to spread the shoes 17 and 18 is nullified. Thereafter, the shoes 17 and 18, under the influence of the spring 21, move from engagement with the inner peripheral surface of the drum 12. The momentum of the disc 14 and the other driven members is soon overcome by the effect of the now extended spring 26, and the spring 26, thereupon, causes the clutch lever 22 to again pivot in a counterclockwise direction about its imaginary pivot point between the lugs 23 and 24 to move the shoes into engagement with the inner peripheral surface of the drum 12. If means are not provided to engage and hold the disc 14 at the exact point where its momentum is overcome by the spring 26, the afore-described series of disengaging and engaging operations will continue for an infinite period. In prior clutches, such as disclosed in the afore-mentioned Nilson et al. patent, the point where the momentum is overcome at a particular driving speed, is ascertained and a latch is provided to move into engagement with the bent-over portion 35 to prevent the retrograde movement of the disc 14, hence preventing the subsequent engaging and disengaging of the shoes 17 and 18. However, the use of such a latch is restricted to use wherein the driving speeds are such as to impart sufficient momentum to the driven members, particularly the disc 14, to insure the disengagement of the clutch shoes. If the driving speeds are below the critical speed necessary to impart sufficient momentum to the driven elements the bent-over portion 35 will not be moved into position to be engaged by the latch, consequently the clutch shoes will continually engage and disengage with the inner peripheral surface of the drum 12.

It is therefore a primary consideration of this present invention to provide a means for moving and holding the disc 14 in a proper position wherein the shoes 17 and 18 are disengaged regardless of the momentum imparted to the driven elements.

Figure 2:
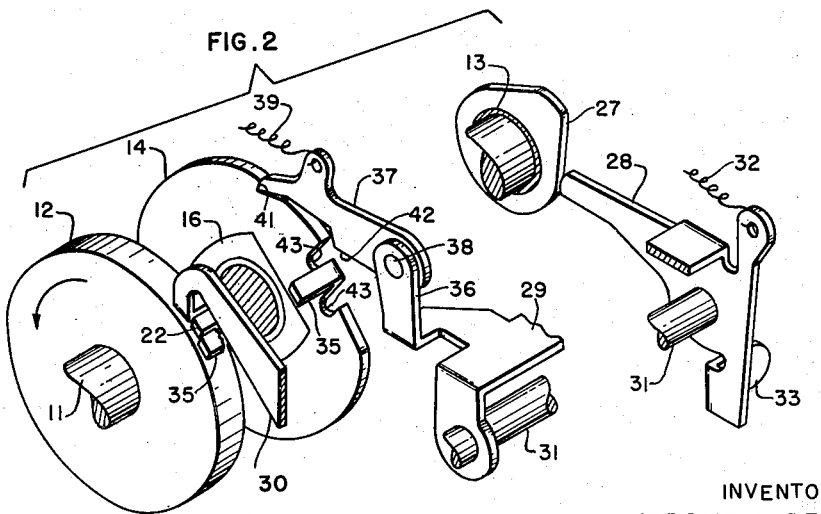
Fig. 2 is an isometric view showing parts not otherwise disclosed.

In the clutch, comprising the present invention, the instant the clutch lever 22 engages and holds the stop lever 30, the pawl 37 has already moved into engagement with the foreward wall of the notch 41. Thereafter, the pawl 37 continues to advance under the influence of the potential energy stored in the extended springs 39 and 32, the result being that the disc 14 is advanced until the bent-over portion 35 strikes the clutch lever 22 as illustrated in Fig. 2. Further movement of the disc 14 is made impossible since further movement of the clutch lever is prevented by the stop lever 30. The stop 34 which engages the depending portion 30 may also be adjusted to limit the pivotal movement of the bail 29, hence limiting the movement imparted to the disc 14 by the pawl 37. Therefore the amount of pivotal movement imparted to the bail 29 may be so limited that the pivotal movement ceases before the bent-over portion 35 strikes the engaged clutch lever 22.

The limited rotative counterclockwise movement imparted to the disc 14 subsequent to the engagement of the clutch lever 22 by the stop lever 30, moves the connector 15 against the shoe 18 to cause the shoe to exert a force against the lug 23. This force exerted on the lug 23 is sufficient to overcome the effect of the spring 26 and results in a slight clockwise pivoted movement of the clutch lever 22 about the imaginary center between the lugs 23 and 24. It may therefore be appreciated that the lugs 23 and 24 are urged from engagement with the shoes 17 and 18, thus allowing the extended spring 21 to fully withdraw the shoes from engagement with the inner peripheral surface of the drum 12. The springs 32 and 39 are sufficiently strong to retain the driven disc 14 in a position so that the shoes 17 and 18 are retained disengaged from the driving drum 12 until the stop member 30 is again removed from engagement with the clutch lever 22.

It is apparent that the speed and momentum of the driven members of the clutch have no effect on whether the clutch shoes will be disengaged from the driving drum 12, for the reason that the shoes engage the drum until just after the follower 28, which controls the toggle actuated pawl 37, falls off the peak of the cam 27. When the pawl 37 is actuated by the toggle mechanism, the disc 14 is driven forward relative to the clutch lever 22 and disengagement of the clutch shoes 17 and 18 from the driving drum 12 is insured.

It is understood that various changes and modifications can be made in the invention without departing from the spirit and scope thereof.

What is claimed is:

1. In a clutch, a rotating drive means, driven means, friction shoes carried by said driven means for connecting said driven means with said drive means, a stop member cooperable with said driven means for stopping rotation of said driven means with said drive means, and a toggle actuated latching means cooperating with said driven means substantially simultaneously with the operation of said stop member to rotate the driven means to thereby insure disengagement of said friction shoes and said drive means.

2. In a clutch, a rotating drive means, driven means, expansible friction shoes carried by said driven means for connecting said driven means with said drive means, means for expanding said friction shoes into engagement with said driving means, means for engaging said expanding means and stopping rotation of said driven means with said drive means, a toggle actuated latching mechanism cooperating with said driven means for insuring contraction of said friction shoes and disengagement between said shoes and said driving means, and means carried by said driven means for operating said toggle actuated latching mechanism substantially simultaneously with the operation of said stopping means to rotate the driven means.

3. In a clutch, a rotating drive means, driven means, expansible friction shoes carried by said driven means for connecting said driven means with said drive means, a clutch lever for expanding said friction shoes into engagement with said drive means, a stop lever for engaging said clutch lever and thereby stopping rotation of said driven means, a toggle actuated latching means cooperating with said driven means for insuring contraction of said friction shoes and disengagement between said shoes and said driving means, and a cam carried by said driven means for operating said toggle actuated latching mechanism substantially simutaneously with the operation of said stop lever.

4. In a friction clutch, a rotatable drive means, driven means, a clutching lever for controlling engagement between said drive and said driven means, a stop lever cooperable with said clutching lever to stop rotation of said driven means with said drive means, and a toggle actuated latching lever operated by said driven means to rotate the driven means to insure disengagement between said drive and driven means upon operation of said stop lever.

5. In a friction clutch, a rotatable driving drum, driven means including a plurality of expansible shoes for engaging said driving drum, a clutching lever carried by said driven means for controlling the expansion of said shoes, a stop lever cooperable with said clutching lever to stop rotation of said driven means with said driving drum, a cam rotatable with said driven means, and a toggle latch controlled by said cam for cooperating with said driven means upon the operation of said stop lever to insure said clutching lever retains said shoes disengaged from said driving drum.

6. In a clutch, drive means, driven means, friction members carried by said driven means to engage the drive means, an actuator carried by said driven means for moving said friction members out of engagement with the drive means, a stop member selectively engageable with said actuator, a cam rotated by said driven means, and a toggle controlled by said cam, said toggle adapted to engage and rotate the driven means at substantially the same time the stop member engages the actuator to rotate the driven means in the direction of the movement of the drive means.

7. In a clutch, drive means, driven means, means to selectively engage the drive and driven means, means to release said selective means to engage the drive means with the driven means to permit their movement in a predetermined direction, and means actuated by the driven means for moving the driven means in the predetermined direction upon substantially simultaneous engagement of said releasing means with the selective means.

8. In a clutch, rotating drive means adapted to rotate in a predetermined direction, driven means, friction shoes carried by the driven means for engaging the driven means with the drive means, an arm for moving the friction shoes into engagement with the drive means, a stop for engaging the arm whereby the arm moves the friction shoes out of engagement with the drive means, a disc carried by the driven means, said disc having a notch formed therein, a toggle latch adapted to enter the notch to drive the disc in the same direction as the drive means, and a cam rotated by said driven means for actuating the toggle substantially simultaneously with the actuation of the stop.

9. In a clutch, drive means, driven means including engaging means for coupling the driven means to the drive means, an actuator for moving the engaging means into and out of engagement with the drive means, a cam connected to and moved by said driven means, stop means for engaging and holding the actuator to permit the disengagement of said drive and driven means, a latch adapted to engage said driven means, a follower device connected to the latch, and resilient means connected to said follower for urging said follower into engagement with the cam, said cam acting to move the follower device against the effect of the resilient means prior to the engagement of the stop means of the actuator, said cam further acting to allow the resilient means to move the follower device subsequent to the engagement of the stop means with the actuator whereby the latch engages and moves the driven means.

10. In a clutch, drive means, driven means including engaging means for coupling the driven means to the drive means, an actuator for moving the engaging means into and out of engagement with the drive means, a cam connected to and moved by said driven means, stop means for engaging and holding the actuator to permit the disengagement of said drive and driven means, a latch adapted to engage said driven means, a follower device connected to the latch, resilient means connected to said follower for urging said follower into engagement with the cam, said cam acting to move the follower device against the effect of the resilient means prior to the engagement of the stop means with the actuator, said cam further acting to allow the extended resilient means to move the follower device subsequent to the engagement of the stop means with the actuator whereby the latch engages and moves the driven means, and means for limiting the extent of movement of the driven means by the latch.

JEROME L. DE BOO.
CARL W. SWAN.

REFERENCES CITED

The following references are of record in the file of this patent:

UNITED STATES PATENTS

| Number | Name | Date |
|---|---|---|
| 367,063 | Reece | July 26, 1887 |
| 553,983 | Heath et al. | Feb. 4, 1896 |
| 902,103 | McFarland | Oct. 27, 1908 |
| 2,298,970 | Russell et al. | Oct. 13, 1942 |
| 2,473,219 | Rhodes | June 14, 1949 |